Figures 1, 2:
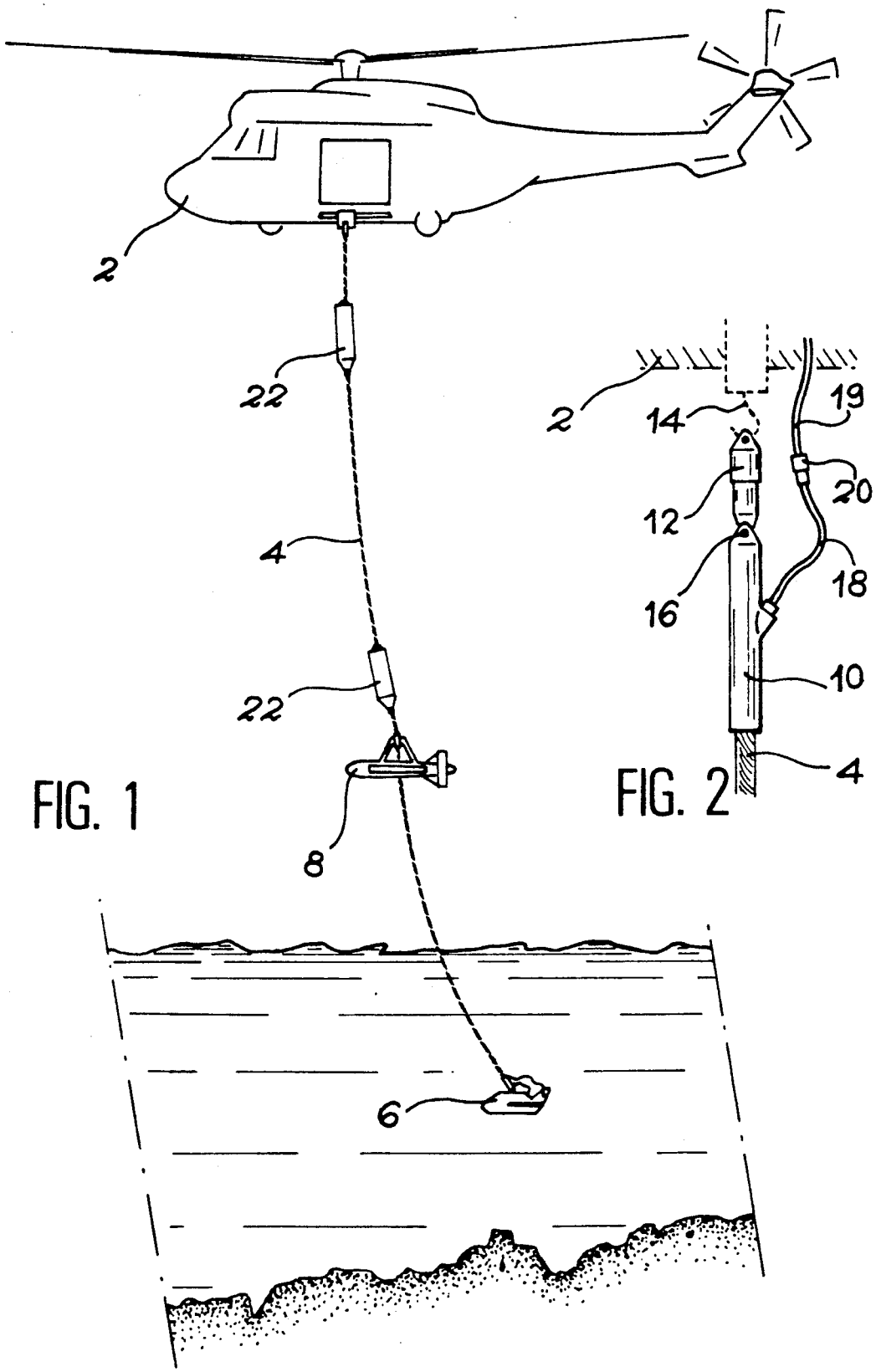

United States Patent [19]
Ruzie et al.

[11] Patent Number: 5,170,379
[45] Date of Patent: Dec. 8, 1992

[54] PROCESS AND SYSTEM FOR MEASURING WHEN DRAGGED UNDERWATER BENEATH A HELICOPTER

[75] Inventors: Gérard Ruzie, Dourdan; Jean Batot, La Norville, both of France

[73] Assignee: Commissariat A l'Energie Atomique, Paris, France

[21] Appl. No.: 731,106

[22] Filed: Jul. 15, 1991

[30] Foreign Application Priority Data

Jul. 17, 1990 [FR] France ............................ 90 09107

[51] Int. Cl.⁵ ............................................ G01S 15/00
[52] U.S. Cl. ..................................... 367/106; 367/130
[58] Field of Search ............... 367/106, 130; 114/244, 114/330, 242; 244/119

[56] References Cited

U.S. PATENT DOCUMENTS

| | | | |
|---|---|---|---|
| 3,404,565 | 10/1968 | Barry et al. | 73/170 A |
| 3,469,444 | 9/1969 | Ayer et al. | 73/170 A |
| 4,025,919 | 5/1977 | Jefferies et al. | 367/106 |
| 4,173,195 | 11/1979 | Gongwer | 367/130 |

FOREIGN PATENT DOCUMENTS

| | | |
|---|---|---|
| 942131 | 2/1974 | Canada . |
| 2045252 | 12/1971 | Fed. Rep. of Germany . |
| 2058746 | 5/1972 | Fed. Rep. of Germany . |
| 2380534 | 9/1978 | France . |

Primary Examiner—Daniel T. Pihulic
Attorney, Agent, or Firm—Pearne, Gordon, McCoy & Granger

[57] ABSTRACT

The system comprises measuring means and carrying or supporting means (6), to which the measuring means are fixed. The carrying means are dragged underwater by a helicopter (2) via a cable (4). The carrier means, equipped with measuring means, have a hydrodynamic shape such that they remain at a substantially constant depth when dragged underwater by means of the cable.

Application to marine soundings.

16 Claims, 4 Drawing Sheets

PROCESS AND SYSTEM FOR MEASURING WHEN DRAGGED UNDERWATER BENEATH A HELICOPTER

DESCRIPTION

The present invention relates to a process and a system for measuring when dragged underwater, particularly in the ocean. It more particularly applies to bathymetry.

It is known to carry out bathymetric measurements from a ship, beneath whose hull are fixed sounding means constituted by an echo sounder. However, when the swell becomes excessive, the narrow acoustic beam produced by the device no longer makes it possible to carry out good depth measurements, particularly in the case of a small ship.

The present invention aims at obviating this disadvantage and more particularly at permitting the performance of good measurements by removing the influence of the swell on the measuring means.

It firstly relates to a process for measuring when dragged underwater, said process being characterized in that the carrying means, to which are fixed the measuring means, are dragged underwater by a helicopter via a cable and in that the carrying means, equipped with the measuring means, have a hydrodynamic shape such that they remain at a substantially constant depth when dragged underwater by means of the cable.

A helicopter makes it possible to intervene in areas which are difficult or even dangerous of access for a boat or ship, such as areas where waves are braking, coral reef areas, fast flowing rivers and barrier lakes.

At the front, the carrying means can comprise a substantially frustum-shaped part to give them, when dragged in water, a downward thrust compensating the upward thrust due to the cable. However, preferably, the carrying means comprise an elongated and substantially cylindrical body, a stabilizing aileron surmounting said body and a tail unit fixed to the rear of the body.

According to a special embodiment of the process according to the invention, ballasting or weighting means are fixed to the aerial part of the cable, so that, inter alia, the accuracy of the measurements can be increased.

The present invention also relates to a system for measuring when dragged underwater, said system being characterized in that it has measuring means and carrying means, to which the measuring means are fixed and which are dragged underwater by a helicopter, via a cable, and in that the carrying means, equipped with the measuring means, have a hydrodynamic shape such that they remain at a substantially constant depth when dragged underwater by means of the cable.

According to a special embodiment of the system according to the invention, at the front, the carrying means comprise a substantially frustum-shaped part in order to give them, when dragged underwater, a downward thrust compensating the upward thrust due to the cable.

The carrying means can have at the front, the substantially frustum-shaped part and at the rear, a fin and two control surfaces, as well as two lateral ailerons extending the substantially frustum-shaped part.

According to a preferred embodiment of the system according to the invention, the carrying means comprise a substantially cylindrical, elongated body, a stabilizing aileron surmounting said body and a tail unit fixed to the rear of the body.

The system according to the invention can also have attitude control means for the said carrying means and which are mounted on the latter. These attitude control means are e.g. provided for giving information on the heading and/or depth and/or altitude above the bottom and/or radial and transverse inclinations of the carrying means.

In a special embodiment of the system according to the invention, said system also has ballasting means to be fixed to the aerial part of the cable. The said ballasting means can have a substantially cylindrical central part, a tail unit and two lateral tail pipes. The latter make it possible to aerodynamically increase ballasting.

The central part of the ballasting means can be provided with means for fixing the cable and an opening enabling the cable to pass through said central part.

Finally, in a special embodiment of the invention, the carrying means have a recess issuing at the bottom of said carrying means and which contains the measuring means. The latter can be sounding means, e.g. bathymetric means.

The invention is described in greater detail hereinafter relative to non-limitative embodiments and the attached drawings, wherein show:

FIG. 1 Diagrammatically a special embodiment of the measuring process according to the invention.

FIG. 2 Diagrammatically the way in which the cable is fixed to the helicopter used in the process.

Figure 3:
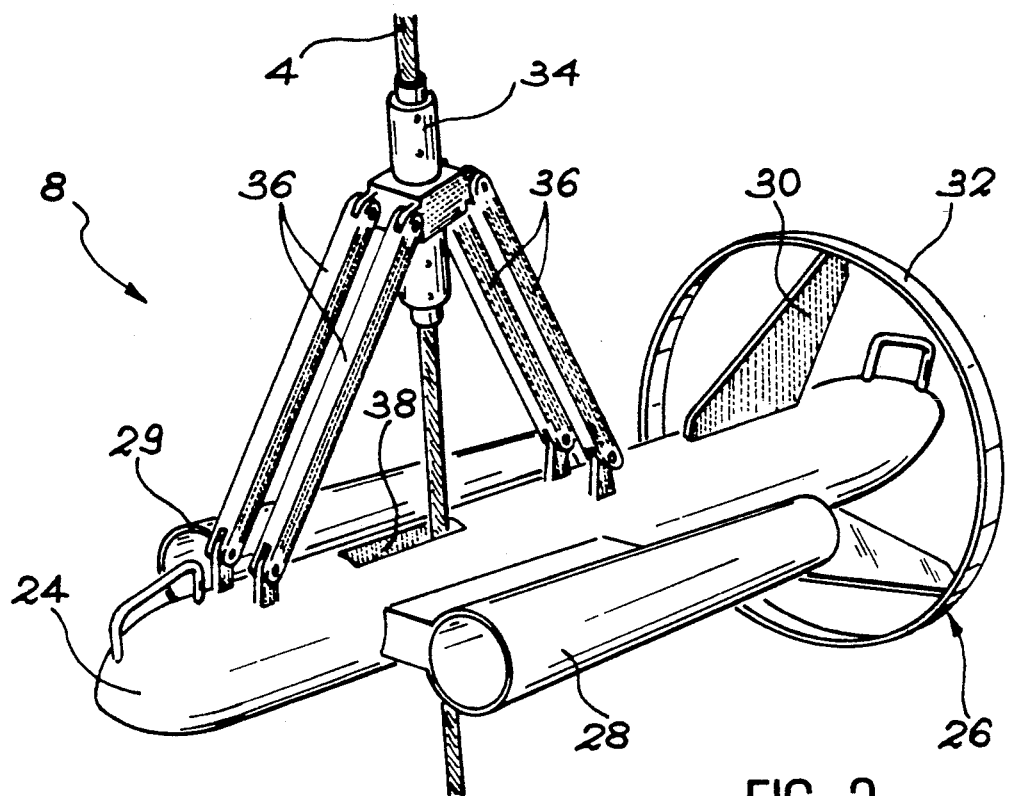

FIG. 3 A diagrammatic perspective view of the ballasting means used in the process of FIG. 1.

Figure 4:
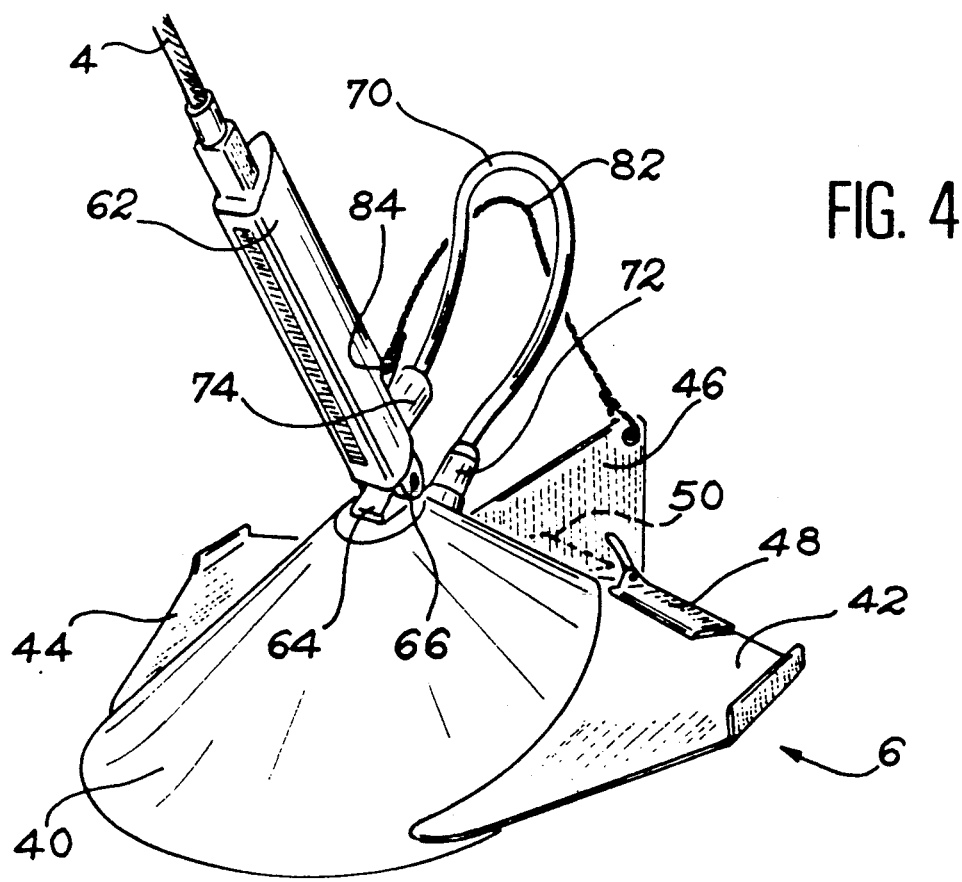

FIG. 4 A diagrammatic perspective view of the carrying means to which the ballasting means are fixed.

Figure 5:
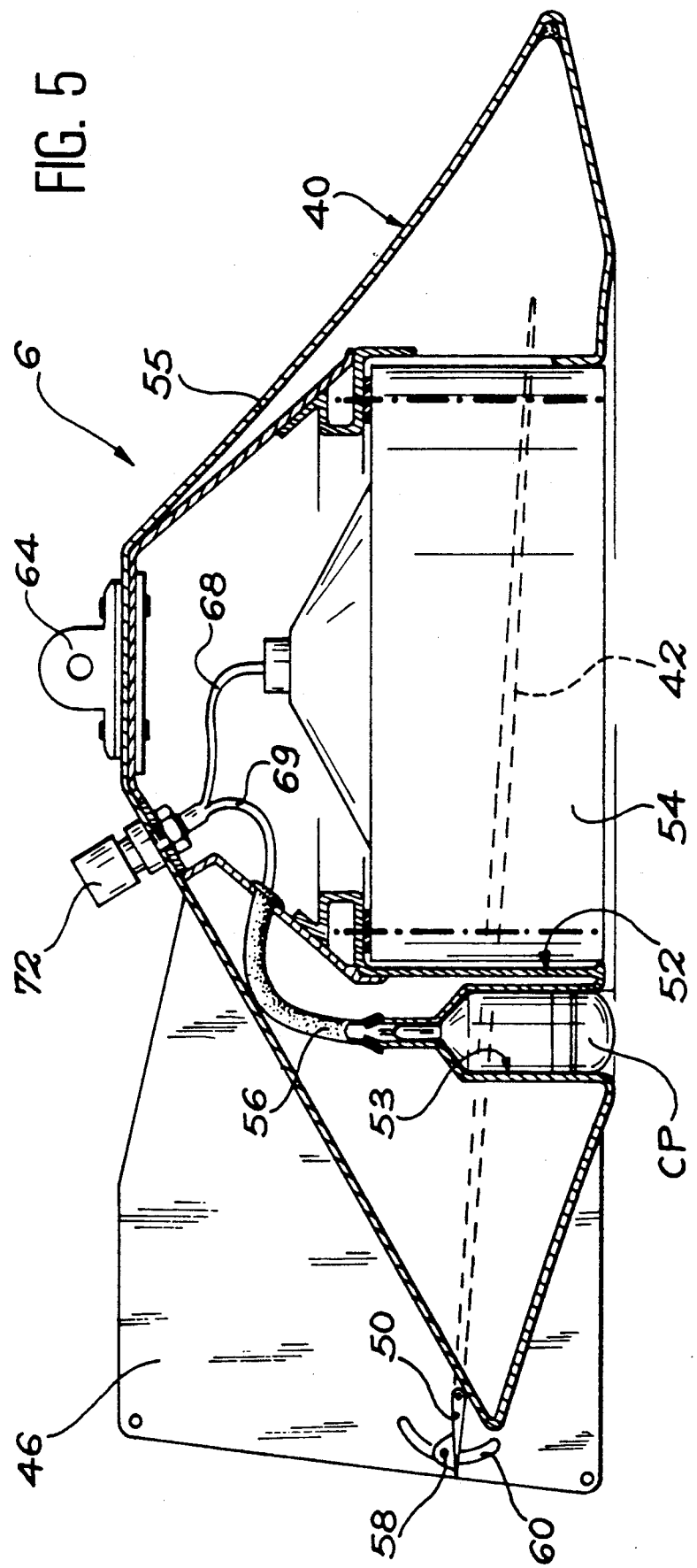

FIG. 5 A diagrammatic longitudinal sectional view of the carrying means of FIG. 4.

Figure 6:
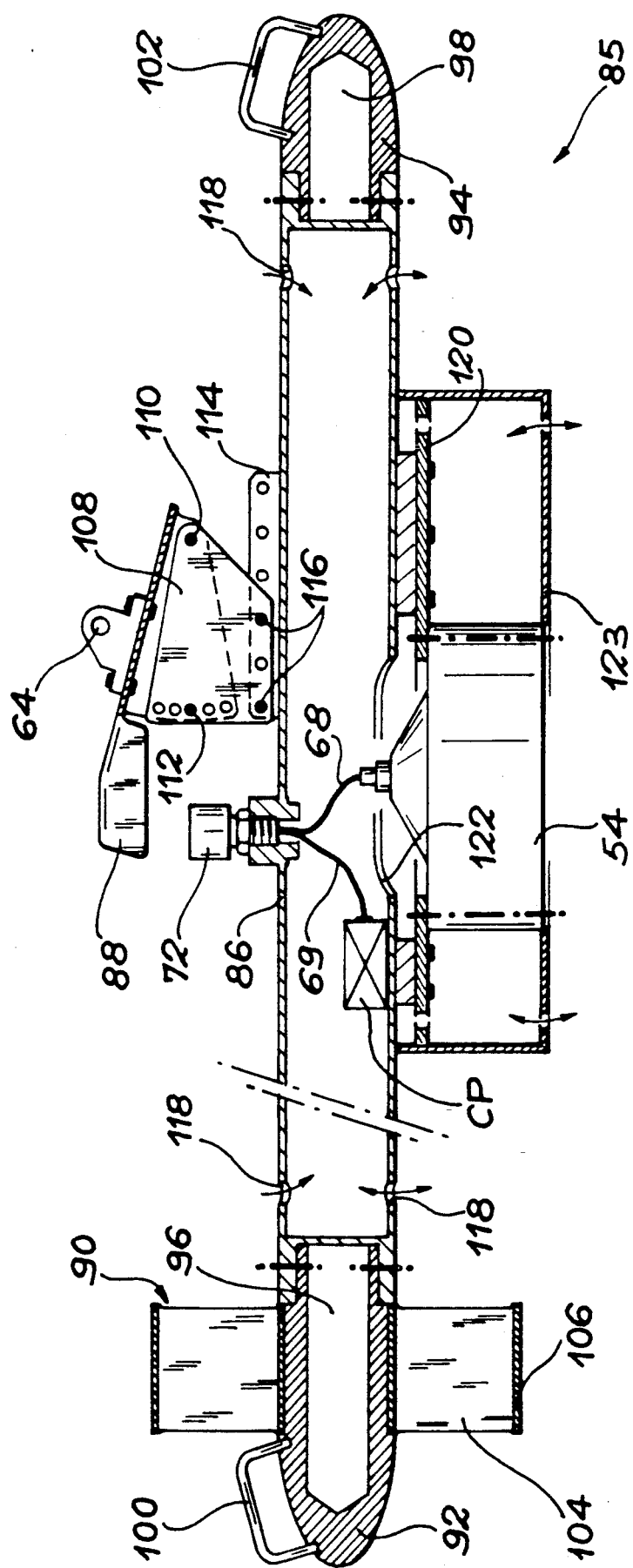

FIG. 6 Diagrammatically a preferred embodiment of the carrying means.

In the particular embodiment of the inventive process diagrammatically illustrated by FIG. 1 bathymetry is e.g. carried out in the ocean. For this purpose use is made of a helicopter 2, which drags the bathymetric means in accordance with a predetermined and generally linear path in the water.

Displacement takes place by an antigyratory cable 4, whereof one end (upper end) is fixed to the helicopter and whereof the other end (lower end) is fixed to appropriate carrying means 6, to which are fixed the bathymetric means. Ballasting means 8, whose function will be described hereinafter, are fixed to the aerial part of the cable.

FIG. 2 shows that the upper end of the cable 4 is immobilized in fixing means 10. The latter are carried by and articulated on a dynamometer 12, which is itself carried by a hook 14 provided on the helicopter 2 and which is referred to as a sling hook. The dynamometer is used for safety reasons and gives information on the weight of the assembly carried by the helicopter.

For the same reason, the fixing means 10 are articulated to the dynamometer by means of a pin 16, whose breaking resistance has a value determined in such a way that the pin 16 breaks when the tension on the dynamometer exerted by the assembly which it carries exceeds the said value, which is obviously chosen as a function of said assembly.

FIG. 2 also shows a two-part electric cable 18 permitting the transmission of electric signals, which are respectively supplied by the bathymetric means and a pressure transducer or "depthmeter" placed in the carrying means 6, to not shown processing means located in the helicopter 2 and which process the signals supplied by the bathymetric means or the like and by the pressure transducer with a view to determining the depth of the ocean along the path followed by the helicopter. The electric cable 18 is integrated into the cable 4, which thus constitutes an electric carrying cable.

The upper part of the cable 18 emerges from the fixing means 10 and is connected to the two-part input cable 19 of the processing means, via a jettisonable connector 20, which is once again provided for safety reasons. Thus, when the assembly carried by the dynamometer exerts a tension thereon which exceeds the predetermined value, said assembly is separated from the helicopter.

Buoys 22 are fixed to the part of the cable 4 located between the locking means 10 and the ballasting means 8 and make it possible to locate, with a view to recovery, the assembly carried by the dynamometer, in the case where said assembly separates from the helicopter when carrying out depth measurements.

To increase the accuracy relative to the location of these depth measurements, the carrying means 6, more simply called "saucer" hereinafter, are positioned as close as possible to the helicopter 2 when dragged by the latter.

The ballasting means 8 are provided for this purpose and make it possible to separate the vertical movements of the helicopter from the movements of the saucer 6 and to stretch that part of the cable 4 located above said ballasting means 8, which are e.g. made from aliminium and shown in FIG. 3.

As can be seen in FIG. 3, the ballasting means 8 comprise a substantially cylindrical, elongated central portion 24, whereof each of the two ends has an ogival or nose cone shape. The central portion 24 is provided with a tail unit 26 and two lateral tail pipes 28, 29.

The tail unit 26 stabilizes, in direction and depth, the path of the ballasting means 8 and, in the example shown, has three ailerons 30 arranged at 120° from one another at the rear of the central portion 24.

A circular part 32 of limited thickness connects the ends of the ailerons 30 and protects them.

Each of the two lateral tail pipes 28 and 29 adopts the shape of a tube, which is open at its two ends and whose axis is parallel to the axis of the central portion 24. These lateral tail pipes give the ballasting means 8 in movement an upward thrust and aerodynamically increase the ballasting action.

The ballasting means shown in FIG. 3 allow displacements up to 90 knots (155 km/h) with a 60 meter long measuring chain suspended beneath the helicopter 2.

In their front part, the ballasting means 8 also comprise means 34 for fixing the cable 4 and rods 36 connecting the fixing means 34 to the central part 24. Each of the rods 36 is articulated, at one end, to the locking means 34 and, at its other end, to the central portion 24.

The cable 4 traverses the fixing means 34, which make it possible to fix and suspend the ballasting means 8 on the cable 4. The central portion 24 of the ballasting means 8 also has an opening 38, which is also traversed by the cable 4.

This central portion 24 is provided with not shown, internal compartments for containing lead weights permitting a balancing of the front of the ballasting means 6 with respect to the rear thereof.

The ballasting means 8 also enable the measuring chain (cable-saucer provided with measuring means) to be stable both during "transits" (high speed displacements in the air) of said measuring chain and during lower speed displacements of the saucer in the water.

The e.g. aluminium saucer 6 is shown in perspective in FIG. 4 and in longitudinal section in FIG. 5. It has a substantially frustum-shaped portion 40, which is laterally extended by two ailerons 42, 44 and whose rear is provided with a fin 46 and two lateral control surfaces 48, 50 on either side of the fin.

Within the substantially frustum-shaped portion 40 are provided a recess 52 and another recess 53 issuing onto the bottom of said portion 40.

The bathymetric means 54, e.g. of the ceramic echo sounder type, are placed in the recess 52 so as to be able to emit an ultrasonic beam in the direction of the ocean bed and receive an echo as a result of said emission.

The pressure transducer CP, which gives information on the depth of the saucer is located in the recess 53. The recesses 52 and 53 are filled with water when the saucer is in the ocean. The space between the recesses 52, 53 and the walls 55 of the substantially frustum-shaped portion 40 forms a tight air-filled compartment.

FIG. 5 shows that the recess 53 is tightly connected to the recess 52 by a pipe 56 provided for this purpose.

The lateral control surfaces 48 and 50 are respectively articulated to the ailerons 42 and 44, to the rear thereof, and constitute depth control surfaces making it possible to adjust the path of the saucer 6.

The orientation of these control surfaces 48 and 50 is determined during tests, prior to the use of the saucer for depth measurements, and the control surfaces 48 and 50 are then immobilized, with the predetermined orientation, by means of a locking screw 58 passing through a curved slot 60 made on the fin 46, the curvature of said slot obviously allowing the rotation of the control surfaces 48, 50 for the setting thereof.

An explanation will now be given of the way in which the saucer 6 is fixed to the lower portion of the cable 4. The saucer 6 is provided with means 62 for fixing the cable 4 (FIG. 4). These fixing means 62 are articulated to a yoke 64 via a pin 66, whose breaking strength has a value predetermined by the users for safety reasons. The yoke 64 is fixed to the top of the substantially frustum-shaped portion 40. The lower portion of the cable 4 is trapped in the fixing means 62.

The electric signals supplied by the echo sounder 54 are transmitted by an electric cable 68 located in the saucer 6. The electric signals supplied by the transducer CP are transmitted by an electric cable 69, which passes into the pipe 56 and issues into the recess 52.

The cables 68, 69 are connected to a double electric cable 70 outside the saucer via an appropriate, jettisonable electrical connector 72 fitted to one wall of the saucer 6. The cable 70 is connected by electrical connection means 74 to the double cable 18 (FIG. 1), which is integrated into the electric carrier cable 4.

A sling 82, whose breaking strength has a value predetermined by users is fixed, by one end, to the fin 46 of the saucer 6 and by its other end to the fixing means 62 via a hook 84. The sling 82 permits the recovery of the saucer 6 if the pin 66 breaks and said breakage can e.g. occur if the saucer 6 is blocked by an unexpected obstacle.

The saucer 6 is designed to protect the echo sounder 54 from the influence of the swell. For this purpose, the substantially frustum-shape of the portion 40, which can be seen in FIG. 5, gives the dragged saucer a downward thrust, which compensates the rising thrust due to the cable dragging the saucer. Thus, the saucer remains at a substantially constant depth when dragged.

If need be, the control surfaces 48, 50 are regulated or set beforehand with a view to compensating an upward or downward drift of the saucer.

The depth at which the saucer 6 is located is between 5 and 10 m as a function of the speed of the helicopter 2.

With said saucer, the ultrasonic beams reflected by the ocean bed are intercepted by the echo sounder with a good signal-to-noise ratio, even at depths of 1500 m or more. The depth given by the pressure transducer CP is added to the depth given by the echo sounder to obtain the real depth. The echo sounder can be of the monobeam or multibeam type.

Moreover, instead of using an echo sounder for carrying out depth measurements, it is possible to use laser beam scanning means or radar beam scanning means (up to depths of approximately 50 m and in clear water).

The bathymetric means can be replaced by other sounding means, e.g. acoustic imaging means, by if necessary adapting the saucer 6 to said other means.

In a preferred embodiment diagrammatically shown in longitudinal sectional form in FIG. 6, the carrying means 85 comprise a substantially cylindrical, elongated hollow body 86, a stabilizing aileron 88 surmounting the body 86 and, to the rear, a tail unit 90. The hollow body 86 is extended at its two ends by ogival parts 92, 94, in which are respectively formed air-filled cavities 96, 98. Transportation handles 100, 102 are respectively provided on the parts 92, 94.

The tail unit 90 is fitted to the part 92 corresponding to the rear of the body. This tail unit 90 e.g. has four ailerons 104 at 90° from one another and whose ends are connected by a circular part 106 of limited thickness and which protects the said ailerons 104.

The stabilizing aileron 88 is articulated to a support 108 about a spindle 110 and is locked in the chosen inclination position with respect to the support 108, by means of a bolt 112. The support 108 is also longitudinally adjustable on fixing flanges 114 fixed to the upper part of the hollow body. Locking bolts 116 are provided for locking the support 108 to the flanges 114 in the chosen longitudinal position.

In the case of FIG. 6, the yoke 64 is made rigidly integral with the aileron 88, as can be seen therein.

In the vicinity of the end parts 92, 94, the hollow body 86 has holes 118 permitting its filling with water when the carrying means 85 are beneath the ocean surface.

In the case of FIG. 6, the echo sounder 54 is fixed to the lower part of the hollow body 86 by means of a plate 120, which is perforated on its periphery and level with the echo sounder 54. In the same way, the hollow body 56 has a perforation 122 level with the echo sounder 54. The latter and the plate 120 are surrounded by a hydrodynamic fairing 123, which is perforated and consequently fills with water when the carrying means 85 are immersed.

In the case of FIG. 6, the pressure transducer CP is fixed to the interior of the hollow body 86 and the jettisonable electrical conector 72 is fitted to the upper part of said hollow body 86. FIG. 6 shows the cables 68 and 69 coming respectively from the echo sounder 54 and the transducer CP and which pass to the connector 72.

We claim:

1. Process for measurement when dragging in water, characterized in that a carrying means (6, 85), to which are fixed a measuring means (54), are dragged beneath the water by a helicopter (2), by means of a cable (4), and in that the carrying means (6, 85), provided with the measuring means (54), have a hydrodynamic shape such that they remain at a substantially constant depth when dragged underwater by means of the cable (4), wherein ballasting means (8) are fixed to the aerial part of the cable (4).

2. Process according to claim 1, characterized in that the carrying means (6) comprise, at the front, a substantially frustum-shaped portion (40) in order to give them, when they are dragged beneath the water, a downward thrust, which compensates the upward thrust due to the cable.

3. Process according to claim 1, characterized in that the carrying means (85) comprise a substantially cylindrical, elongated body (86), a stabilizing aileron (88) surmounting said body and a tail unit (90) fixed to the rear of the body (86).

4. System for measuring on dragging in water, comprising a measuring means (54) fixed to a carrying means (6, 85) which are dragged underwater by a helicopter (2), via a cable (4), and in that the carrying means (6, 85), provided with the measuring means (54), have a hydrodynamic shape such that they remain at a substantially constant depth when dragged underwater by means of the cable (4), said carrying means (6) comprising, at the front, a substantially frustum-shaped portion (40) for giving them, when dragged underwater, a downward thrust compensating the upward thrust due to the cable and, at the rear, a fin (46) and two control surfaces (48, 50) and two lateral ailerons (42, 44) extending the substantially frustum-shaped portion (40).

5. System according to claim 4, characterized in that the carrying means (6) comprise a recess (52), which issues from a base of these carrying means (6) and which contains the measuring means (54).

6. System according to claim 4, characterized in that the measuring means are sounding means (54).

7. System for measuring on dragging in water, comprising a measuring means (54) fixed to a carrying means (6, 85) which are dragged underwater by a helicopter (2), via a cable (4), and in that the carrying means (6, 85), provided with the measuring means (54), have a hydrodynamic shape such that they remain at a substantially constant depth when dragged underwater by means of the cable (4), said system further comprising means (CP) for controlling the attitude of the carrying means (6, 85) and which are fitted to the latter.

8. System according to claim 7, characterized in that the carrying means (85) comprise a substantially cylindrical, elongated body (86), a stabilizing aileron (88) surmounting said body and a tail unit (90) fixed to the rear of the body (86).

9. System according to claim 8, characterized in that the measuring means (54) are fixed to the lower portion of the body (86) and surrounded by a hydrodynamic fairing (123).

10. System according to claim 7, characterized in that the measuring means are sounding means (54).

11. System for measuring on dragging in water, comprising a measuring means (54) fixed to a carrying means (6, 85) which are dragged underwater by a helicopter (2), via a cable (4), and in that the carrying means (6, 85), provided with the measuring means (54), have a hydrodynamic shape such that they remain at a substantially constant depth when dragged underwater by mEans of the cable (4), said system further comprising ballasting means (8) which are fixed to the aerial part of the cable (4).

12. System according to claim 11, characterized in that the ballasting means (8) comprise a substantially cylindrical central portion (24), a tail unit (26) and two lateral tail pipes (28, 29).

13. System according to claim 12, characterized in that the central portion (24) is provided with means (34) for fixing the cable (4) and an opening (38) enabling the cable (4) to pass through the central portion (24).

14. System according to claim 11, characterized in that the carrying means (85) comprise a substantially cylindrical, elongated body (86), a stabilizing aileron (88) surmounting said body and a tail unit (90) fixed to the rear of the body (86).

15. System according to claim 14, characterized in that the measuring means (54) are fixed to the lower portion of the body (86) and surrounded by a hydrodynamic fairing (123).

16. System according to claim 11, characterized in that the measuring means are sounding means (54).

* * * * *